United States Patent [19]

Lewis

[11] Patent Number: 4,625,833
[45] Date of Patent: Dec. 2, 1986

[54] PORTABLE TREE SEAT

[76] Inventor: Kenneth D. Lewis, 10438 Young St., Wisconsin Rapids, Wis. 54494

[21] Appl. No.: 828,444

[22] Filed: Feb. 10, 1986

[51] Int. Cl.⁴ .......................... A01M 31/02; A45F 3/26
[52] U.S. Cl. .................................... 182/187; 108/152
[58] Field of Search ................. 182/187, 188; 108/152

[56] References Cited

U.S. PATENT DOCUMENTS

| | | |
|---|---|---|
| 2,711,783 | 6/1955 | Prill . |
| 3,115,213 | 12/1963 | Cloutier . |
| 3,730,294 | 5/1973 | Thurmond . |
| 3,749,200 | 7/1973 | Meyer . |
| 3,885,649 | 5/1975 | Damron ............................. 182/187 |
| 3,927,733 | 12/1975 | Wurn et al. . |
| 3,990,537 | 11/1976 | Swenson ............................ 182/187 |
| 4,113,057 | 9/1978 | Bessinger ........................... 182/187 |
| 4,113,058 | 9/1978 | Kobosh .............................. 182/187 |
| 4,484,660 | 11/1984 | Baynum . |

*Primary Examiner*—Reinaldo P. Machado
*Attorney, Agent, or Firm*—Isaksen, Lathrop, Esch, Hart & Clark

[57] ABSTRACT

A portable tree seat has a generally flat platform with a back edge for engaging a post or tree and is held in position on the tree by a rope. A flexible strap is secured to the platform near its front edge and extends to the back edge of the platform where it is adjustably secured in position by being passed through a pair of slots formed in the platform. A rigid elongated brace is attached to the flexible strap and is cradled therein between the positions of securement of the strap to the platform. When the back edge of the platform is held in position on a tree, the flexible strap may be adjusted such that the brace is held by the strap in a position engaging the tree at its back end and extending up to a position supporting the platform at its front end so that the platform is held in a substantially horizontal position. The brace is held only by the strap so that the brace may shift to its most stable position when the platform is loaded.

13 Claims, 4 Drawing Figures

PORTABLE TREE SEAT

FIELD OF THE INVENTION

This invention pertains generally to the field of portable seats and stands and particularly those adapted to mount to a vertical post or column structure, including trees.

BACKGROUND OF THE INVENTION

A wide variety of portable tree seats or stands are known and are currently used. Sportsmen and hunters carry such stands along into wooded areas and can mount the stand or seat to a tree at a suitable height. Often such tree stands are used by bow hunters who attach the stands to the tree at a high elevation so that they can shoot down at deer. However, tree seats are also utilized to provide a comfortable and convenient seat at normal chair height.

In a typical construction for a portable tree seat or stand, the seat or platform is formed to butt up against the tree at one end and to be firmly attached to the tree at that end, as by a rope or collar which encircles the tree and is attached also to the platform at the end which meets the tree. To hold the platform in position extending horizontally away from the tree, the typical tree seat has a brace or spar pivotally connected to the underside of the platform near its outer end; the brace then is adapted to extend downwardly and engage with the tree to thereby support the weight of the individual sitting on the platform. Examples of such prior tree seat structures are found in U.S. Pat. Nos. 2,711,783; 3,115,213; 3,730,294; 3,749,200; 3,927,733; 4,113,057; 4,484,660. Of particular significance in such tree seat designs is the manner in which the brace is held in position against the tree so that the brace does not slip and release its support of the platform. Thus, tree seats have been formed having braces with spiked or pointed tips to penetrate into the tree to positively prevent slippage, or which otherwise include means to hold the end of the brace in position on the tree. However, such designs often prove difficult to adjust in position on the tree, and sometimes allow the platform to shift from a horizontal position as weight is applied to the platform and the platform slides downwardly on the tree. Many of the prior tree platforms have additionally been relatively heavy and bulky, making them inconvenient to carry into the woods.

SUMMARY OF THE INVENTION

The tree seat of the present invention is formed of simple, inexpensive and relatively light components which are mounted together so that they can be readily folded into a compact and easily handled package for carrying by a hunter or sportsman. The seat is adapted to quickly and easily attach to a tree at any desired height and to be readily and easily adjusted in elevational position on the tree, but nonetheless provide a secure mounting on the tree which will readily support an individual's weight without substantial shift in position.

The tree seat has a seating platform formed of a solid material, e.g., wood, having a back edge which is shaped to generally engage well with the outer circular periphery of a tree. A rope threaded through the platform at its back end is adapted to be tied around the tree to secure the back edge of the platform to the tree in a normal manner. A fabric strap is secured to the platform near its front and back edges, preferably such that the length of the strap between the positions of securement to the platform can be adjusted. A rigid brace is firmly attached to the strap so that a front portion of the strap extends from one end of the brace to securement to the platform near its front edge while a back portion of the strap extends from the other end of the brace up to securement with the platform toward its back edge. The brace is otherwise not attached or connected to the platform, and the strap is highly flexible so that the brace can be laid flat against the platform when the tree seat is to be carried. When the seat is mounted to a tree, the brace is extended downwardly so that its back edge engages with the tree and its front edge presses against the outer portion of the fabric strap and thence against the outer portion of the platform. The brace is prevented from slipping downwardly by the back portion of the strap. The position of the back edge of the brace on the tree can be adjusted, thereby adjusting the angle of the platform with respect to horizontal, by drawing the back portion of the strap through strap engagement slots in the platform, with the strap being held at any desired position by the friction between the strap and the walls of the slot in the platform.

Because the brace is very flexibly attached to the platform by means of the strap, the position of the brace can easily be adjusted when it is on the tree to conform to any irregularities of the tree trunk, as the brace is not restricted in movement by a rigid hinge as typically utilized in tree seat structures. The brace will naturally tend to shift to find a stable position when weight is applied to the platform.

Further objects, features, and advantages of the invention will be apparent from the following detailed description when taken in conjunction with the accompanying drawings.

DETAILED DESCRIPTION OF THE INVENTION

Figure 1:
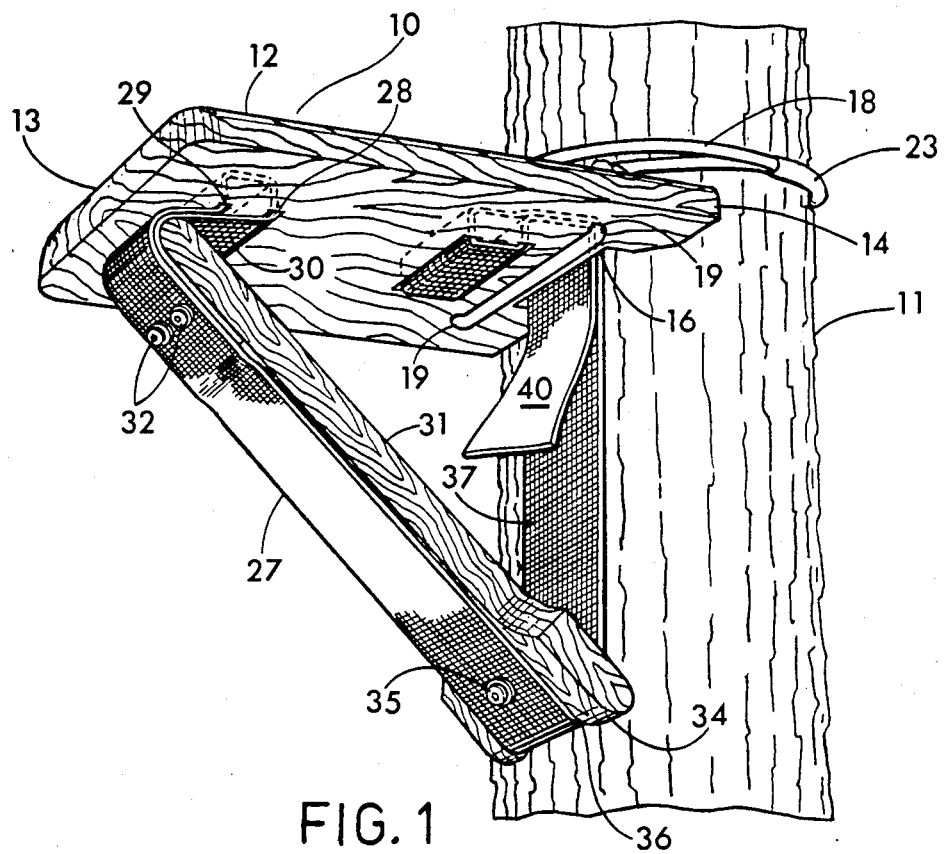
Fig. 1 is a perspective view showing the tree seat of the invention mounted on the tree.

With reference to the drawings, a preferred embodiment of a portable tree seat in accordance with the present invention is shown generally at 10 in FIG. 1 mounted to a tree trunk illustrated at 11. The tree seat 10 includes a generally flat platform 12, having flat top and bottom surfaces, which has a front edge 13 and a back edge 14. The platform 12 is preferably formed of a strong, relatively lightweight material, such as various sturdy grades of wood. The back edge 14 of the platform has an indented central notch portion 16 and beveled sides 17 extending inwardly to the indented notch 16 to generally adapt the back edge 14 of the platform to fit against the circular periphery of the tree trunk 11, as best illustrated in the top view of FIG. 3 in which the trunk 11 is shown in cross-section.

Figure 3:
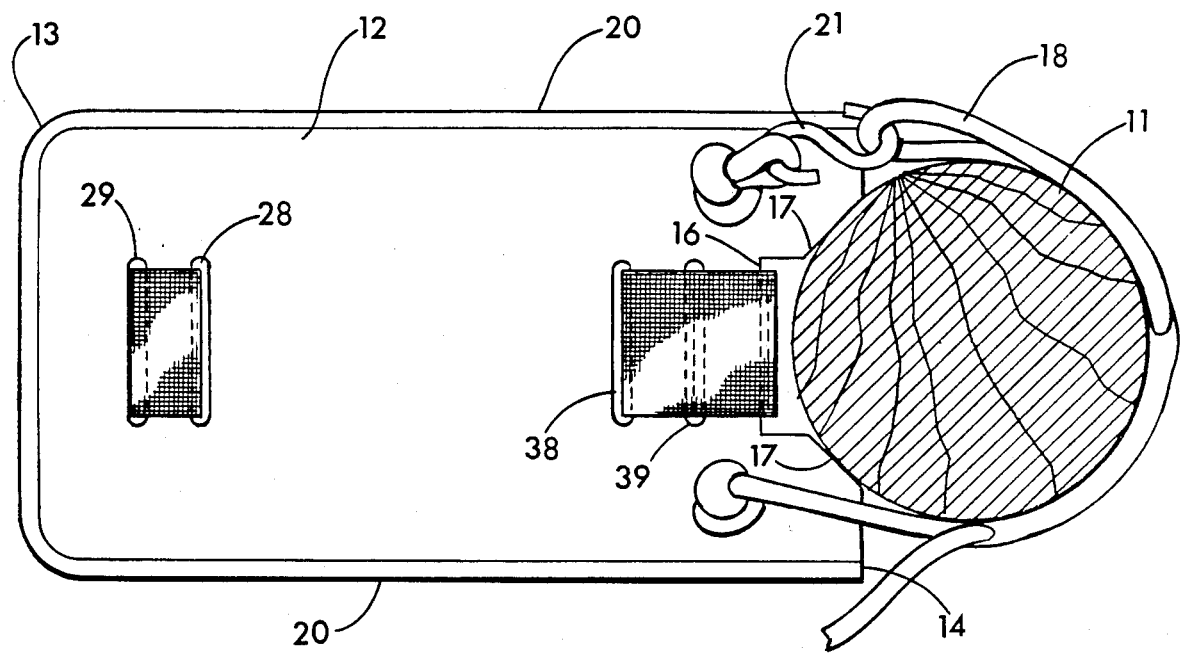
FIG. 3 is a top view of a tree seat as in FIG. 1 mounted on a tree.

To hold the back edge 14 of the platform firmly in position against the tree, a rope 18 is threaded through openings 19 in the platform located on either side of the central notch 16 and generally near the outer side edges 20 of the platform 12. The rope 18 can then be wrapped around the tree trunk 11 with one free end of the rope being preferably attached by a hook 21 to a loop 22 formed in the end of the rope 18 which extends out from one of the openings 19. For rapid attachment and release of the rope to the tree, it is generally preferred that the rope have a structure as illustrated in FIG. 3 in which the rope can be looped around the hook 21 and then passed back through a sleeve portion 23 which allows the free end 24 of the rope to be drawn by the user to tighten the connection of the rope to the tree. Once the rope is drawn taut, the free end 24 may be pulled over to be tied to the hook 21 or otherwise secured to prevent slipping.

A flexible fabric strap 27 is secured to the platform 12 near its front edge 13 by being threaded through a pair of slots 28 and 29 in the platform, with the fabric strap 27 having a front portion 30 composed of the doubled over strap passed through the slots 28 and 29. The doubled over front portion 30 of the strap is attached to an elongated, rigid brace 31 by connectors, e.g., screws, 32. The brace 27 is preferably formed as shown, having flat top and bottom sides, with the fabric strap 27 being attached to the brace at its bottom side by the connectors 32 near the front end 33 of the brace, and also attached to the brace near its back end 34 by a connector 35. The strap 27 passes over the back end 34 of the brace 31 in a notch 36 formed in the end 34 and thence extends upwardly, with the fabric strap having a back portion 37 which extends upwardly through the platform notch 16 and into two slots 38 and 39 formed in the platform 12 near its back edge. The back portion 37 of the strap is preferably passed through the notch 16 and over the top surface of the platform, through the slot 38 and over the bottom of the platform, and thence back up through the slot 39 and around underneath the portion of the strap 27 that is fitted into the notch 16.

Figure 2:
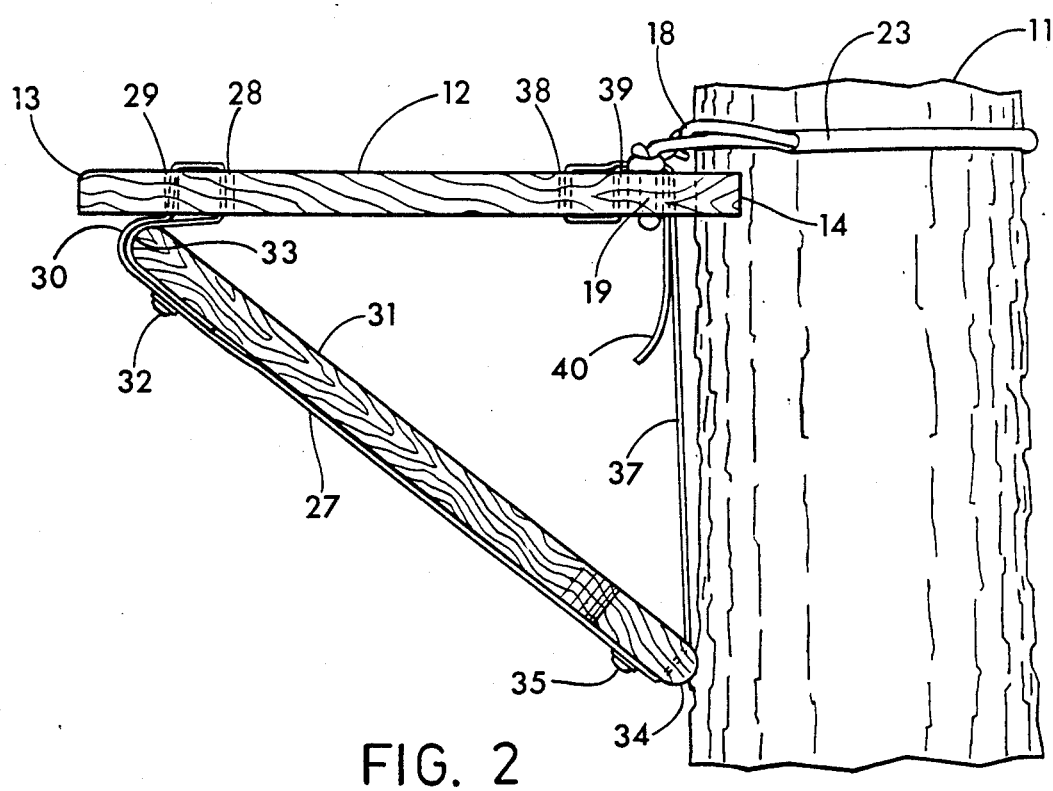
Fig. 2 is a side elevation view of the tree seat mounted on a tree.

When in use, the brace 31 is extended downwardly to the position shown in FIGS. 1 and 2 after the rope 18 is engaged with the tree to firmly hold the back end 14 of the platform against the tree. The user can easily adjust the position of the brace 31 so that its back end 34 engages the tree trunk at a higher or lower position, thereby raising or lowering the front edge 13 of the platform 12 until the platform is in the desired horizontal position. This adjustment of the brace 31 is accomplished by manipulating the free end 40 of the strap. For example, if it is desired to raise the position at which the back end 34 of the brace 31 engages the tree, the user can manipulate the strap through the slots 38 and 39 and pull downwardly on the free end 40 of the strap when weight is released from the platform to pull the back portion 37 of the strap upwardly, bringing the back end 34 of the brace with it. Conversely, when it is desired to move the back end of the brace 34 downwardly, the user can release the weight from the platform 34 and move it slightly upwardly and loosen the strap in the slots 38 and 39. Then, by pulling downwardly on the strap portion 37, the back end 34 of the brace can be dropped to a desired position. When this position is reached, the brace can be pulled downwardly to draw the end portion 37 of the strap taut against the free end 40 and pull the strap tight within the slots 38 and 39 so that further downward movement of the back end 34 of the brace is prevented.

Figure 4:
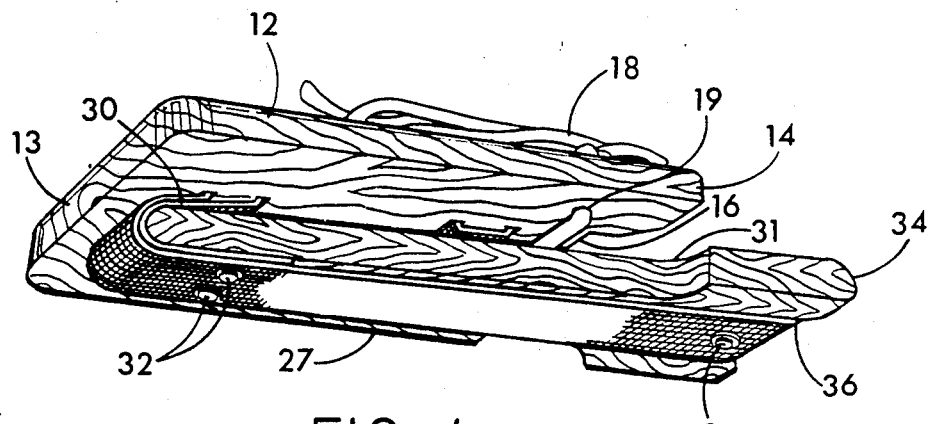
Fig. 4 is a perspective view of the tree seat of the invention shown in its folded position for carrying.

When it is desired to carry the tree seat from one location to another, the rope 18 can be readily untied from the tree, releasing the seat from the tree and allowing the brace 31 to be folded up flat against the underside of the platform 12 in the compact position illustrated in FIG. 4. Because the brace 31 is connected to the platform 12 only by the flexible strap 27, the position of the brace 31 with respect to the platform 12 can be shifted around as desired by the user to achieve the most convenient carrying position.

Because the brace 31 is connected to the tree seat by the flexible strap 27, including its flexible front portion 30 and back portion 37, the position of the brace 31 with respect to the platform 12 can shift laterally as well as vertically so that the brace, when the tree seat is attached to the tree, can find its own orientation in which the back end 34 of the brace accommodates irregularities in the surface of the tree trunk 11. The platform 12 will thus sit firmly and properly against the tree trunk even if the brace 31 is oriented at a somewhat off-center position with respect to the platform.

For greatest strength and security, it is preferred that the flexible strap 27 be formed as a one-piece unit, secured at one end as shown to the tree seat and extending underneath the brace 31 over the full length of the brace, and being attached to the brace as exemplified by the connectors 32 and 35 at positions preferably closely adjacent to the front and back ends of the brace. In this manner, the flexible strap will always be maintained in position extending over the front and back ends of the brace. Alternatively, the flexible strap could be formed of a front portion which is attached at the front end of the brace 31 and extends upwardly to securement to the platform 12 at a position near its front edge 13. Similarly, the strap portion 37 could be formed as a separate strap attached to the back end 34 of the brace 31 which extends upwardly to securement to the platform 12 at a position adjacent to its back edge. Although a variety of materials could be utilized for the flexible strap, a preferred material is a wide (approximately the width of the brace) heavy gauge woven nylon fabric which combines high strength and desired flexibility. It may be noted from a review of the structures of FIGS. 1 and 2 that an advantage of having a single piece strap is that very little stress need be applied to the strap by the connectors 32 and 35 when the seat is in use. As illustrated in the view of FIG. 2, the brace 31 is craddled within the strap at the front and back ends of the brace so that the brace is held in position solely by the inwardly drawing action of the strap at the ends of the brace. The connectors ensure that the strap does not slip sideways off the brace as the brace twists or displaces sideways. The connectors 32 and 35 also serve to hold the strap to the brace when the tree seat is not in its mounted position on a tree, as when the tree seat is being carried or is in its folded position illustrated in FIG. 4.

It is understood that the invention is not confined to the particular construction and arrangement of parts herein illustrated and described, but embraces such modified forms thereof as come within the scope of the following claims.

The invention claimed is:

1. A portable tree seat comprising:
   (a) a platform having a front edge and a back edge;
   (b) a rigid elongated brace having a front end and a back end;
   (c) a front flexible strap portion attached to the brace and extending up and secured to the platform, and a back flexible strap portion attached to the brace and extending up to the platform and adjustably secured thereto;

(d) means on the platform attachable to a vertical post structure such as a tree for holding the back edge of the platform in position engaging the post structure, whereby with the platform back edge so engaged, the brace may be positioned by adjusting the strap such that the brace is held by the strap in position between the post structure and the platform to support the platform in a horizontal position.

2. The portable tree seat of claim 1 wherein the front and back flexible strap portions are portions of a one-piece strap which extends from securement to the platform at a position near the front edge of the platform to adjustable securement to the platform at a position near the back edge of the platform.

3. The portable tree seat of claim 1 wherein the strap is made of a woven fabric.

4. The portable tree seat of claim 1 wherein the means for holding the back edge of the platform in position on the post structure comprises a flexible rope attached to the platform and positioned to be wrapped around the vertical post structure and attached to the platform to draw the back edge of the platform into engagement with the vertical post structure.

5. The portable tree seat of claim 2 wherein the brace has a substantially flat bottom side and the strap is attached to the bottom side of the brace by connectors passing through the flexible strap and into the brace.

6. The portable tree seat of claim 1 wherein the platform has two slots therein shaped to admit the strap therethrough and wherein the back flexible strap portion is secured to the platform by extending over the back edge of the platform and thence downwardly into a first of the slots and thence upwardly through the second of the slots and thence over the top surface of the platform.

7. The portable tree seat of claim 6 wherein the back edge of the platform has a central inwardly notched portion over which the back flexible strap portion extends and also beveled side portions extending to the notch which are shaped to engage against a generally circular post structure.

8. A portable tree seat comprising:
(a) a platform having generally flat bottom and top surfaces and a front edge and a back edge;
(b) a flexible strap having a front portion secured to the platform near its front edge and a back portion adjustably secured to the platform near its back edge;
(c) an elongated rigid brace having a front end and a back end and generally flat top and bottom sides, the flexible strap attached to the brace on its bottom side such that the brace is cradled in the strap and the strap extends over the front end and the back end of the brace;
(d) means on the platform attachable to a vertical post structure such as a tree for holding the back edge of the platform in a position engaging the post structure, whereby the position of the brace with respect to the platform can be adjusted by adjustment of the engagement of the back portion of the strap to the platform to hold the brace in position between the vertical post structure at its back end and the bottom surface of the platform at its front end and to support the platform in a generally horizontal position.

9. The portable tree seat of claim 8 wherein the strap is made of a woven fabric.

10. The portable tree seat of claim 8 wherein the means for holding the back edge of the platform in position on the post comprises a flexible rope attached to the platform and positioned to be wrapped around the vertical post structure and attached to the platform to draw the back edge of the platform into engagement with the vertical post structure.

11. The portable tree seat of claim 8 wherein the strap is attached to the bottom surface of the brace by connectors passing through the flexible strap and into the brace at positions near the front and back ends of the brace.

12. The portable tree seat of claim 8 wherein the platform has two slots therein shaped to admit the strap therethrough and wherein the back flexible strap portion is secured to the platform by extending over the back edge of the platform and thence downwardly into a first of the slots and thence upwardly through the second of the slots and thence over the top surface of the platform.

13. The portable tree seat of claim 8 wherein the back edge of the platform has a central inwardly notched portion over which the back flexible strap portion extends and also beveled side portions extending to the notch which are shaped to engage against a generally circular post structure.

* * * * *